United States Patent Office 3,189,589
Patented June 15, 1965

3,189,589
POLYMERIZATION OF OLEFINS WITH A TITANIUM HALIDE-TRANSITION METAL BOROHYDRIDE CATALYST
Donald R. Witt, Bartlesville, Okla., assignor to Phillips Petroleum Company, a corporation of Delaware
No Drawing. Filed July 1, 1960, Ser. No. 40,172
13 Claims. (Cl. 260—93.7)

This invention relates broadly to the polymerization of 1-olefins. In another aspect, this invention relates to a novel polymerization catalyst. In still another aspect, this invention relates to a novel and improved polymerization catalyst for 1-olefins and method of manufacturing the catalyst.

The polymerization of polymerizable hydrocarbon monomers such as olefins and diolefins by means of various catalyst systems are known in the art. One such catalyst system consists of a transition metal borohydride or hydrocarbon derivative thereof as a polymerization catalyst for the polymerization of olefins and diolefins. In accordance with my present invention, I have now discovered that a catalyst of enhanced utility can be prepared by admixing a transition metal borohydride with a titanium halide.

It is an object of this invention to provide a new and improved polymerization catalyst.

It is another object of this invention to provide a novel method for preparing a catalyst particularly active in polymerizing 1-olefins.

Still another object of this invention is to provide an improved process for the polymerization of 1-olefins to normally solid polymers.

Still another object of this invention is to provide an improved process for the polymerization of 1-olefins to normally liquid polymers.

Other objects, features, and advantages of this invention will be obvious to those skilled in the art from a study of this disclosure and the appended claims.

These objects are broadly accomplished by the method of the present invention by the polymerization of polymerizable olefinic compounds in the presence of a hydrocarbon solvent and in the presence of a catalyst selected from the group consisting of (A) mixtures of a titanium halide and a transition metal borohydride or these components plus an aluminum trihalide, and (B) isolated precipitates formed in admixtures of titanium halides and transition metal borohydride or these components plus an aluminum trihalide.

In one embodiment of this invention, olefins are polymerized in the presence of a hydrocarbon diluent and a catalyst by contacting said olefin with a catalyst selected from the group consisting of the following:

(1) $TiX_2$ and $M(BH_4)_z$,
(2) $TiX_3$ and $M(BH_4)_z$,
(3) $TiX_4$ and $M(BH_4)_z$ and $AlX'_3$ wherein X is a halide selected from the group consisting of chloride, bromide and iodide; M is at least one transition metal selected from the group consisting of zirconium and hafnium; X' is a halide selected from the group consisting of chloride and fluoride; and z is an integer equivalent to the valence of M.

In another embodiment of this invention, olefins are polymerized to liquid polyolefins in the presence of a hydrocarbon diluent by first reacting admixtures of metal halides and metal borohydrides in a hydrocarbon diluent, said admixtures selected from the group consisting of the following:

(1) $TiX_2 + M(BH_4)_z$
(2) $TiX_3 + M(BH_4)_z$
(3) $TiX_4 + M(BH_4)_z$
(4) $TiX_4 + M(BH_4)_z + AlX'_3$ wherein X is a halide selected from the group consisting of chloride, bromide and iodides; M is at least one transition metal selected from the group consisting of zirconium and hafnium; X' is a halide selected from the group consisting of chloride and fluoride; and z is an integer equivalent to the valence of M; separating the resulting solid reaction product, contacting the olefin under polymerization conditions in the presence of a hydrocarbon diluent and said reaction product to produce a liquid polymer and separating said liquid polymer product from said diluent and said catalyst.

In one aspect of this invention, the catalytic components are impregnated on a suitable porous support selected from the group consisting of natural clays and synthetic gels, preferably silica, silica-alumina, alumina, zirconia, bauxite and thoria prior to use in the polymerization zone.

In another aspect of this invention, the catalytic components are activated by pretreating said components at elevated temperatures.

In a preferred embodiment of this invention, the catalyst comprises an admixture in hydrocarbon diluent of zirconium and/or hafnium borohydrides and di- and tri-valent titanium halides. These metal borohydrides are characterized by the formula $M(BH_4)_x$ where M is at least one transition metal selected from the group consisting of zirconium and hafnium and x is an integer equal to the valence of M. The second component of the catalyst in this embodiment of the invention comprises a titanium halide characterized by the formula $TiX_y$ where X is a halide selected from the group consisting of chloride, bromide, and iodide, preferably chloride and bromide, and y is an integer equal to the valence of titanium not exceeding 3.

Examples of preferred catalyst include $TiCl_2$ and $Zr(BH_4)_4$, $TiCl_3$ and $Zr(BH_4)_4$, $TiCl_2$ and $Hf(BH_4)_4$, $TiCl_3$ and $Hf(BH_4)_4$, $TiBr_2$ and $Zr(BH)_4$, $TiBr_3$ and $Zr(BH_4)_4$, $TiBr_2$ and $Hf(BH_4)_4$, $TiBr_3$ and $Hf(BH_4)_4$, $TiCl_3$ and $Zr(BH_4)_4$ and $Hf(BH_4)_4$, $TiCl_2$ and $Zr(BH_4)_4$ and $Hf(BH_4)_4$, and the like.

In addition to the aforementioned list of catalysts, it has been discovered that these specific catalysts are assisted in the polymerization of olefins by the addition of a third component comprising aluminum trichloride or aluminum trifluoride. This halide may be hydrated or anhydrous. In particular, the catalytic activity of titanium tetrahalide and the metal borohydride are assisted by the promotion of aluminum trichloride or aluminum trifluoride when employed in the range of 0 to 1 mol, preferably 0.2 to 0.5 mol, of aluminum halide per mol of titanium halide plus metal borohydride. Applicant has discovered that the aluminum halide favorably influences the rate of polymerization and the yield of polymer and further effects modification of polymer properties, such as inherent viscosity.

In one aspect of this embodiment of the invention, it has been discovered that improved yields can be obtained by preheating the catalyst components prior to polymerization of the monomers. The pretreatment of the catalytic components is preferably effected at a temperature within the range of about 150 to 300° F. for a period of 0.1 to 10 hours. The temperature of pretreatment need not be the same as the temperature for polymerization. At the end of the pretreatment period the catalyst components are used as described herein for the polymerization of the polymerizable olefins. During the pretreatment the catalytic components may be dispersed in a hydrocarbon diluent.

In another aspect of this embodiment of this invention, the catalytic components are impregnated or deposited on a suitable oxide porous support selected from the group consisting of natural clays and synthetic gels, preferably silica, silica-alumina, alumina, zirconia, bauxite and thoria. These porous solids are first dried by heating, usually to a temperature in the range of about 500 to 1200° F. for a period of 0.5 to 100 hours in a stream of dry inert gas. Air, nitrogen, hydrogen, helium and the like are suitable inert gases. The dried supports can be conveniently impregnated with the titanium halide and the metal borohydride by dissolving the desired amount of these compounds in a suitable solvent such as cyclohexane and using the resultant solution to completely saturate the porous solid thereby insuring uniform distribution of the catalytic components. It is preferred to employ supported catalyst which contain 0.05 to 20 weight percent, more preferably 1 to 10 weight percent, of the titanium halide-metal borohydride composite. The molar ratio of zirconium and/or hafnium borohydride to titanium halide on the supported catalyst is ordinarily within the range of 0.2 to 3, preferably in the range of 0.3 to 2, and most preferably about 1. In the preparation of the supported catalyst either the titanium halide or the metal borohydride may be first deposited or impregnated on the solid support. However, it has been found that better yields are obtained when the titanium halide is added first followed by the metal borohydride.

The molar ratio of the metal borohydride to titanium halide employed in this invention is ordinarily within the range of 0.2 to 3, preferably in the range of 0.3 to 2 and most preferably about 1.0. It has been found that as the ratio of metal borohydride to titanium halide is decreased to below about 0.3, the polymerization product is frequently a liquid although this will depend upon the monomer and the halide used. The reaction is ordinarily carried out in a hydrocarbon diluent with the preferred diluents being normally liquid paraffins and/or naphthenes, although aromatics can be used. Examples of preferred solvents are normal pentane, isooctane and cyclohexane. These catalysts may be either dispersed in the hydrocarbon liquid phase as a slurry or dissolved therein depending on the temperature used and the particular catalyst combination used.

The polymerization of the olefins can be carried out at a temperature ranging from 0° F. up to 400° F. with temperatures of 150° F. to 300° F. generally being preferred and a temperature in the range of 225° F. to 300° F. being still more preferred. Pressure of the operation is not critical but it should be sufficient to maintain a liquid phase in the reactor. Pressures in the range of 100 to 500 p.s.i. are normally used but somewhat higher or lower pressures can be employed. Operation of the polymerization reactor with a vapor phase in a portion of the reaction system is satisfactory and even desirable in some cases. In mechanically agitated reactors, operation with a gas cap provides a reservoir of monomer which dissolves in the liquid phase as the polymerization proceeds. This type of operation is well known in the art. The polymer may be separated from the solvent by any convenient method known to the art.

In a second embodiment of this invention, I have discovered that when titanium tetrachloride and a zirconium and/or hafnium borohydride are contacted in a hydrocarbon diluent phase solid reaction products are formed which are isolatable and which are effective for promoting polymerization of 1-olefins. Further, the solid catalyst prepared according to this embodiment of the invention has unique properties. For example, an admixture of four or less parts of titanium tetrachloride and one or more parts of zirconium tetraborohydride in a hydrocarbon solvent ordinarily produces a solid polymer when employed for the polymerization of propylene; however, when using the same combination, the solid reaction product which is separated from the slurry produces a liquid polymer of propylene. The liquid polymers of propylene which are produced in accordance with the process of this invention can be fractionated to yield dimers, trimers, tetramers, pentamers, and hexamers of high purity.

To prepare a polymerization catalyst by a method within the scope of this embodiment, titanium tetrachloride and zirconium and/or hafnium tetraborohydride are reacted in a suitable inert medium which is a solvent for the reaction components. A preferred medium is the liquid hydrocarbon diluent used in the polymerization reaction, such as the $C_5$ to $C_{20}$ alkanes and cycloalkanes. For example pentane, hexane, 2-methylbutane, heptane, octane, decane, hexadecane, eicosane, cyclohexane, methylcyclohexane and the like are employed alone or in admixture with each other to form a suitable inert medium for this reaction. Titanium tetrachloride is readily soluble in these hydrocarbons. It is preferable to add the zirconium tetraborohydride to the titanium tetrachloride solution rather than vice versa, although either method produces an effective catalyst. An atmosphere of a dried inert gas such as nitrogen is preferably maintained over the system during the process to prevent contact with materials which tend to deactivate the catalyst, such as oxygen.

The molar ratio of zirconium and/or hafnium borohydride to titanium halide which is reacted is generally between 0.05 to 5.0, preferably 0.1 to 3.0. The reaction proceeds quite rapidly at temperatures between 0 to 250° F. with temperatures in the range of 50° F. to 150° F. being preferred. Any convenient pressure may be used that will maintain the solvent in the liquid phase. The solid reaction product which forms is recovered by any suitable separation means such as filtration, decantation, centrifugation, or other suitable means. Solution is removed by washing with additional hydrocarbon diluent and then the reaction product is dried so as to remove free diluent. Satisfactory drying may be achieved in a vacuum oven at pressures below about 1 millimeter of mercury at temperatures of 50 to 250° F. for periods of 0.5 to 100 hours. The resulting dry product is kept in an inert atmosphere. When reacting titanium tetrachloride and zirconium tetraborohydride it has been observed than an initially formed precipitate is white while a subsequently formed precipitate is a dark brown material. The white precipitate and the dark brown precipitate can be mixed and recovered together as a single reaction product. Preferably, the total reaction period is from about 0.1 to 100 hours.

As will be apparent to those skilled in the art, some variation in the technique of catalyst preparation is possible without departing from the principle of admixing the reactants in a medium which is a solvent for both reactants at a temperature and pressure sufficient to effect a reaction. Preferably, each reactant is dissolved in a solvent so that the solution contains from about 0.002 to 0.2 gram of reactant per cubic centimeter solution.

In all embodiments of the invention, the polymer can be recovered from the polymerization reaction mixture by any suitable means. For instance, solid polymer and catalyst may be separated from the reaction mixture by filtration, decantation, centrifugation or other conventional means. Liquid products can be distilled to recover the solvent and further distilled to separate the liquid polymer into suitable boiling range fractions. The liquid polymer can also be separated by chromatographic techniques or other well known procedures.

The materials which are polymerized in accordance with this invention can be defined broadly as polymerizable hydrocarbons. Preferably, the polymerizable hydrocarbons are olefins containing a $CH_2=C<$ radical in an alkyl portion of the monomer. The preferred class of polymerizable hydrocarbons used is aliphatic 1-olefins having up to and including 8 carbon atoms per molecule. Specifically the normal mono-1-olefins are preferred. Examples of the preferred olefins include ethylene, propylene, 1-butane, 1-hexene, and 1-octene. Branched chain olefins can also be used, such as isobutylene. Examples of the di- and polyolefinic aliphatic hydrocarbons in which the double bonds are in nonconjugated position and which can be used in accordance with this invention are 1,5-hexadiene, 1,4-pentadiene, and 1,4,7-octatriene. Mixtures of the foregoing polymerizable hydrocarbons can be polymerized to a solid polymer in the presence of the described catalyst, as, for example, by copolymerizing ethylene and propylene, ethylene and 1-butene, propylene and 1-butene, or propylene and a pentene. This invention is also applicable to the polymerization of a monomeric material comprising conjugated dienes containing from 4 to 8 or more carbon atoms. Examples of conjugated dienes which can be used include 1,3-butadiene, isoprene, 2,3-dimethylbutadiene, 2-methoxybutadiene, 2-phenylbutadiene, and the like. It is also within the scope of the invention to polymerize such conjugated dienes either alone or in admixture with each other and/or with one or more other compounds containing an active $CH_2=C<$ group which are copolymerizable therewith. Examples of such compounds are listed hereinabove.

The above enumeration of polymerization reactions promoted by the catalyst of this invention is not intended to be exhaustive but rather illustrates the wide variety of monomers which are polymerized or copolymerized by the method of this invention.

In a specific embodiment of this invention, a catalyst is prepared by admixing a titanium halide, such as titanium trichloride, with a metal borohydride, such as zirconium tetraborohydride, in a hydrocarbon diluent, such as cyclohexane. This catalyst is then introduced into a polymerization reactor with a hydrocarbon diluent, such as cyclohexane, and the reactor maintained at a temperature in the range of 150° F. to 300° F. at a pressure sufficient to maintain the diluent in a substantially liquid phase. The olefin, such as a propylene, is then introduced into the reactor and the operating conditions maintained for a period of time, such a 1–6 hours, sufficient to produce an amount of polymer. Agitation may be provided within the reactor to keep the polymer in suspension. At the end of the polymerization cycle the solvent and excess olefin are separated from the polymer product by any suitable means, such as flashing of the solvent and precipitation of the polymer in a water bath.

My invention will be further described with reference to the following examples. These examples show the operability of the invention and the advantages thereof and should not be considered limiting in any manner except as taught by the complete specification and claims.

A weighed amount of titanium trichloride was charged to a steel, 1.4 liter, stirred reactor in a dry, prepurified, nitrogen atmosphere to which was added 300 grams of polymerization grade cyclohexane. The metal borohydride, dissolved in cyclohexane, was added by means of a hypodermic syringe. The reactor was then closed and heated to reaction temperature at which time enough propylene (approximately 250 grams) was added to maintain 450 p.s.i.g. at reaction temperature. When the pressure dropped to 440 p.s.i.g. during the run, more propylene was added to maintain 450 p.s.i.g. The propylene was previously dried by passing through Ascarite,* followed by activated alumina. Runs were of two hours' duration.

The footnote reference numerals (1) through (5) are explained at the end of the examples, columns 10 and 11.

EXAMPLE I

Using the procedure described hereinbefore, a run was made with a catalyst comprising 1.1 grams of titanium trichloride and 0.59 gram of zirconium tetraborohydride. A 230 gram portion of propylene was initially charged to the reactor and 130 grams were added during the polymerization. Test data were:

| | |
|---|---:|
| Total grams solid propylene | 167.5 |
| Grams of polymer per gram of total catalyst | 99 |
| Grams of polymer per gram of titanium trichloride | 152 |
| Isotactic content (1), percent | 80–85 |
| Inherent viscosity (2) | 2.93 |
| Melt index (3) | 0.28 |
| Density (4), gms./cc. | 0.9033 |
| Flexural modulus (5) | 119,000 |

For comparison, the co-catalyst system of lithium borohydride and titanium trichloride was examined for propylene polymerization using the aforementioned procedure except for the necessary modification of adding the solid lithium borohydride from a graduated enclosed tube similar to that used for adding titanium trichloride to the reactor. Run data were:

| | | |
|---|---|---:|
| Titanium trichloride | grams | 0.68 |
| Lithium borohydride | do | 0.37 |
| Polymer made | | Trace |

The above illustrates the desirability of the borohydride of zirconium, hafnium or combinations thereof.

EXAMPLE II

Using the procedure hereinbefore described immediately preceding Example I, hafnium tetraborohydride was examined for propylene polymerization efficacy. The run data were:

| | | |
|---|---|---:|
| Titanium trichloride | grams | 0.43 |
| Hafnium tetraborohydride | do | 0.36 |
| Polymer made | do | 46.3 |
| Grams of polymer per gram of total catalyst | | 58.5 |
| Isotactic content (1) | percent | 69 |

For comparison, runs were made using zirconium tetraborohydride, hafnium tetraborohydride and titanium triborohydride alone. Run conditions were similar to those described in Example I with the following exceptions.

The reactor was charged with 1.03 grams of zirconium tetraborohydride, 300 grams of cyclohexane, and about 250 grams of propylene and heated to 270° F. for 24 hours with a maximum pressure of 580 p.s.i.g. and a minimum pressure of 545 p.s.i.g. Only a trace of polymer was made. Total polymer and catalyst amounted to 1.186 grams.

Using the procedure described immediately above, 1.66 grams of hafnium tetraborohydride was used as the catalyst in a 24-hour run at 240° F. with only a trace of polymer being made.

Using the same procedure as for the two preceding runs, 0.09 gram of titanium triborohydride was charged to the reactor along with 300 grams of cyclohexane and 169 grams of propylene. The reactor was maintained at 225° F. at an average reactor pressure of about 480 p.s.i.g. for 23½ hours with a total polymer production of 1.49 grams. It can be seen from the above runs that the metal borohydrides are not as effective as polymerization catalysts as when used in conjunction with the titanium halide.

---

\* Sodium hydroxide-asbestos absorbent.

EXAMPLE III

Several runs were made using the reaction conditions hereinbefore described immediately preceding Example I to illustrate the comparative efficacy of different co-catalyst systems on both propylene and ethylene. The following table tabulates these runs along with the reaction conditions, the reactants, the co-catalyst systems, and the isotactic content of the polymer.

*Table I*

| Run No. | Halide Compound | Halide Amount, gms. | Borohydride Compound | Borohydride Amount, gms. | Olefin compound | Reaction conditions (2 hrs.) °F. | Reaction conditions (2 hrs.) P.s.i.a. | Polymer, grams | Percent isotactic(1) | Gms. polymer per gms. total catalyst | Gms. polymer per gms. titanium halide |
|---|---|---|---|---|---|---|---|---|---|---|---|
| (1) | $TiCl_2$ | 0.48 | $Zr(BH_4)_4$ | 0.58 | Propylene | 240 | 450 | 19.8 | 76.3 | 18.7 | 41.2 |
|  | $TiCl_3$ | 1.1 | $Zr(BH_4)_4$ | 0.59 | do | 240 | 450 | 167.5 | 82 | 99 | 152 |
| (2) | $TiCl_3$ | 0.64 | $Zr(BH_4)_4$ | 0.3 | Ethylene | 275 | 300 | 168.3 |  | 185 | 263 |
|  | $TiCl_4$ | 0.38 | $Zr(BH_4)_4$ | 0.29 | do | 275 | 300 | 168.5 |  | 253 | 448 |
| (3) | $TiCl_3$ | 0.43 | $Hf(BH_4)_4$ | 0.36 | Propylene | 240 | 450 | 46.3 | 69 | 58.5 | 107.5 |
|  | $TiCl_3$ | 0.43 | $Zr(BH_4)_4$ | 0.23 | do | 240 | 450 | 37 | 73.5 | 56 | 86 |
| (4) | $TiCl_3$ | 1.1 | $Zr(BH_4)_4$ | 0.59 | Propylene | 240 | 450 | 167.5 | 82 | 99 | 152 |
|  | $TiCl_3$ | 0.64 | $Zr(BH_4)_4$ | 0.3 | Ethylene | 275 | 300 | 168.3 |  | 185 | 263 |

As can be seen above, Run 1 compares the efficacy of titanium dichloride with titanium trichloride in the co-catalyst system using zirconium tetraborohydride on propylene. It will be seen that although both halides are effective in the polymerization of propylene, the titanium trichloride is the more effective.

Run 2 compares the co-catalyst system using zirconium tetraborohydride with either titanium trichloride or titanium tetrachloride on ethylene. It will be seen from the above data that both co-catalyst systems are equally effective for the polymerization of ethylene.

Run 3 compares a catalyst comprising titanium trichloride with either hafnium tetraborohydride or zirconium tetraborohydride using propylene as the olefin. It will be seen that hafnium or zirconium tetraborohydride are approximately equal in polymerization efficacy.

Run 4 compares the same co-catalyst system of titanium trichloride and zirconium tetraborohydride on two different olefins, namely, propylene and ethylene. Although both olefins are readily polymerized, it will be seen that the catalyst system is somewhat more effective with ethylene.

EXAMPLE IV

This example illustrates the improved yields that can be obtained by preheating the catalyst components prior to the polymerization of the monomers.

The co-catalyst components were charged to a 1.4 liter stirred reactor along with 300 grams of cyclohexane, dispersed and heated to a temperature of 260° F. for a time indicated in Table II below. After the activation period, propylene was admitted to the reactor at a rate so as to maintain polymerization pressure at about 450 p.s.i.a. At the end of the desired polymerization period, the reactor was vented and the polymer was recovered.

*Table II*

| $TiCl_3$ (gms.) | $Zr(BH_4)_4$ (gms.) | Activation, °F. | Conditions, hrs. | Polymerization, °F. | Conditions, hrs. | Gms. polymer per gms. total catalyst |
|---|---|---|---|---|---|---|
| 0.62 | 0.347 | 260 | 2 | 240–272 | 1.5 | 297 |
| 0.34 | 0.17 | 260 | 3 | 235–252 | 2.0 | 236 |
| 0.31 | 0.30 | 260 | 3 | 235–255 | 2.5 | 358 |

By comparing these runs with the runs illustrated in Example I using the same co-catalyst system and similar reaction conditions, it will be readily seen that pretreating of the catalyst prior to introduction to the polymerization zone further improves the efficacy of the co-catalyst system as a catalyst for the polymerization of olefin monomers.

EXAMPLE V

This example illustrates the use of an aluminum halide in conjunction with a titanium halide-metal borohydride co-catalyst system for the polymerization of olefin monomers. These runs were made in accordance with the procedure hereinbefore outlined immediately preceding Example I.

*Table III*

| Run No. | 1 | 2 |
|---|---|---|
| A. Catalyst: |  |  |
| $TiCl_4$, g | 0.57 | 0.56 |
| $Zr(BH_4)_4$, g | 0.46 | 0.45 |
| $AlF_3$ (61% pure-hydrated) | 0.3 | 0 |
| B. Polymerization data: |  |  |
| Reaction temp., °F | 240 | 240 |
| Pressure, p.s.i.g | 450 | 450 |
| Time, hr | 1.5 | 2.0 |
| Yield of polymer, g | 137 | 135 |
| C. Polymer properties: |  |  |
| Viscosity (2) | 0.72 | 0.55 |
| Melt index (3) | 4.57 | 204 |
| Density (4) | 0.881 | 0.876 |
| Flexural modulus (5) | 19,000 |  |
| Isotactic, percent (1) |  | 32.1 |

It will be seen from the above data that the use of an aluminum halide increases the rate of the polymerization reaction and also modifies to some extent the polymer properties.

EXAMPLE VI

This example illustrates the use of the reaction product as a polymerization catalyst.

*Preparation of catalysts.*—A combination reactor-filter was constructed of Pyrex glass. Means were provided for flushing with nitrogen gas and maintaining a nitrogen atmosphere. The flask, about 1 liter in capacity, was charged with 50 ml. of cyclohexane and 38 ml. of a cyclohexane solution containing 0.0115 mol titanium tetrachloride. Next there was charged 41 ml. of a cyclohexane solution of zirconium tetraborohydride, the solution containing 0.005 mol $Zr(BH_4)_4$. The reaction was at room temperature of about 70–80° F. At first, a white precipitate formed; and the supernatant liquor above the white precipitate turned brown as additional solid material formed. The entire mixture was intermittently stirred at about 5 minute intervals for a period of two hours. The mixture was then aged about 24 hours. The solid phase was removed by filtration and washed with six portions (50 ml. each) of dry cyclohexane. The filtration and washings were effected in a nitrogen atmosphere. The product was dried at room temperature at a pressure below 1 mm. of mercury. The dry product was a brown, powdery solid. Analysis of a portion of the product gave the following results:

| Component: | Weight percent |
|---|---|
| Titanium | 22.7 |
| Zirconium | 9.8 |
| Boron | 0.75 |

From this analysis the computed Zr/Ti mol ratio is 0.23.

The preparation of this catalyst is summarized in Table IV together with details relating to the preparation of other catalysts B, C and D. These products were prepared by substantially the same process.

*Table IV.—Summary of catalyst preparations*

| Catalyst | Solvent* | $TiCl_4$ soln., ml. | $Zr(BH_4)_3$ soln., ml. | $TiCl_4$, g. | $Zr(BH_4)_3$, g. |
|---|---|---|---|---|---|
| A | Cyclohexane | 38 | 41 | 2.17 | 0.75 |
| B | ---do--- | 35 | 50 | 2.45 | 0.90 |
| C† | ---do--- | 33 | 50 | 2.31 | 0.90 |
| D | ---do--- | 15 | 48 | 1.11 | 0.85 |

*Except for catalyst D, 50 ml. of cyclohexane was charged to the flask prior to charging the cyclohexane solutions of $TiCl_4$ and $Zr(BH_4)_3$. For catalyst D, the volume was 40 ml.

†Another similar batch was made. The combined batches were designated as catalyst C and employed for polymerization of olefins.

*Polymerization of propylene with Catalyst A.*—A stainless steel reactor having a capacity of 1400 ml. was flushed with nitrogen for 15 to 20 minutes while maintaining a reactor temperature of about 240–250° F. The reactor was then cooled to room temperature (70–80° F.) and charged with the above-described catalyst A in amount of 1.53 grams and 300 grams of cyclohexane. The reactor was sealed and heated to 240° F. within about a 30-minute period. During the next 10-minute interval, 330 grams of propylene was added and the pressure reached 450 p.s.i.g. Thereafter propylene was added at a rate so as to maintain the reaction pressure at about 450 p.s.i.g. for a period of 2 hours. The reactor was then cooled to about 40° F. by circulation of cold water through the reactor jacket. This cooling was effected in about 15 minutes. The reactor was then vented to remove excess propylene together with some cyclohexane which was recovered in a trap surrounded with ice.

The liquid phase remaining in the reactor was covered by decantation and distilled at atmospheric pressure to recover cyclohexane. A portion of the kettle product, which amounted to 128.8 grams, was analyzed and found to contain:

| | Weight percent |
|---|---|
| Propylene trimer | 32 |
| Propylene tetramer | 38 |
| Propylene pentamer | 18 |
| Propylene hexamer | 6 |
| Lighter than trimers | 6 |

This polymerization run is summarized as Run No. 1 of Table V.

*Other polymerization runs.*—Other polymerization runs made with the catalyst of Example I are summarized in Table V. These runs were made as described immediately preceding Example I except for indicated variations in process conditions. Thus, for some runs n-pentane was used as diluent in place of cyclohexane. The volume of n-pentane employed was that calculated to be the same as the volume (385 ml.) of cyclohexane. Further, for runs wherein n-pentane was used the reactor was not cooled at the end of the reaction period. Rather, the liquid reaction mixture was passed directly to the distillation vessel and the n-pentane was recovered by distillation. The solid product, if any, was washed with solvent and dried.

Referring to Table V, it is seen that all the catalyst produced loquid polymers of propylene. For the conditions employed the amount of solid polymer was generally less than 25 weight percent of the total product. The liquid products comprised a major amount of material representing $C_9$–$C_{18}$ hydrocarbons, i.e., trimers through hexamers of propylene.

Catalyst B produced solid polymer from ethylene (Run 5).

As shown by Run 10, liquid products are also produced with higher olefins. However, some solid polymer also resulted from the polymerization of 1-butene.

*Table V.—Polymerization of olefins*

| Run No. | Solvent | Catalyst | Catalyst, g. | Olefin | Time, hr. | Temp., °F. | Pressure, p.s.i.g. | Product Liquid, g. | Product Solid, g. | Analysis of liquid product Below $C_9$ | $C_9$ | $C_{12}$ | $C_{15}$ | $C_{18}$ | Percent residue |
|---|---|---|---|---|---|---|---|---|---|---|---|---|---|---|---|
| 1 | Cyclohexane | A | 1.53 | Propylene | 2 | 240 | 450 | 128.8 | 4.0 | 6 | 32 | 38 | 18 | 6 | 0 |
| 2 | ---do--- | B | 0.99 | ---do--- | 2 | 300 | 450 | 62.2 | 0 | 65.8 | 0 | 0 | 0 | 0 | 34.2 |
| 3 | ---do--- | B | 1.14 | ---do--- | 2 | 270 | 450 | 69.1 | 0 | 58.1 | 13.3 | 21.6 | 7.1 | | 0 |
| 4 | ---do--- | B | 1.18 | ---do--- | 2 | 240 | 450 | 60.7 | 2.1 | 17.8 | 29.6 | 30.7 | 21.9 | | 0 |
| 5 | ---do--- | B | 0.60 | Ethylene | 1.5 | 270 | 300 | 0 | 82.5 | | | | | | |
| 6 | n-Pentane | C | 0.91 | Propylene | 1 | 270 | 450 | 60.7 | 0 | 25.4 | 35.8 | 24.1 | 13.1 | 1.5 | 0 |
| 7 | ---do--- | C | 1.0 | ---do--- | 1 | 270 | 300 | 57.5 | 0 | 27.6 | 29.4 | 27.2 | 12.5 | 3.3 | 0 |
| 8 | ---do--- | C | 0.98 | ---do--- | 2 | 210 | 450 | 62.7 | 18.6 | 2.6 | 38.5 | 31.8 | 16.5 | 10.6 | 0 |
| 9 | ---do--- | C | 1.06 | ---do--- | 2 | 240 | 450 | 80.1 | 2.6 | 1.5 | 34.0 | 38.1 | 16.0 | 10.4 | 0 |
| 10 | ---do--- | C | 1.06 | ---do--- | 2 | 300 | 450 | 43.0 | 1.7 | 7.3 | 36.3 | 27.9 | 23.4 | 5.1 | 0 |
| 11 | ---do--- | C | 1.26 | 1-butene | 2 | 240 | 450 | 90.2 | 15.0 | | | | | | |
| 12 | ---do--- | D | 1.0 | Propylene | 1 | 270 | 450 | 52.6 | 3.5 | 15.2 | 33.1 | 23.2 | 14.9 | 13.6 | 0 |
| 13 | ---do--- | D | 0.90 | ---do--- | 1 | 300 | 450 | 33.8 | 0.4 | 7.2 | 46.1 | 32.6 | 10.0 | 4.1 | 0 |

(1) The isotactic content of each product was determined by placing 2.5±0.1 grams of polymer in a weighed extraction thimble and extracting in an ASTM Rubber Extraction Apparatus for 2.5 hours with 100 ml. of boiling normal heptane. The thimble was then removed and dried in a forced air oven at 110° C. for 2 hours after which it was cooled in a desiccator and weighed. The weight percent of residue, based on original polymer, was calculated and recorded as isotactic content.

(2) Inherent viscosity is determined by the method of Kemp et al., Industrial Engineering Chemistry 35, 1108 (1943).

(3) For melt index, the method of ASTM D-1238-52T is used with five runs being run at 2-minute intervals, averaging the five weights, discarding any values which deviate from the average by more than 5 weight percent, reaveraging and multiplying by 5 to obtain the amount of extrudate in 10 minutes. If the melt index is low, such as less than 1.0, the High Load Melt Index may be obtained by ASTM D-1238-57T (procedure 5) using a weight of 21,600 grams.

(4) Density as used herein is determined by compression molding a slab of the polymer, cooling said molding at a temperature reduction rate of 15 to 20° F. per minute to room temperature, cutting a pea-sized specimen therefrom, and placing said specimen in a 50-ml. glass-stoppered graduate. Carbon tetrachloride and methyl cyclohexane are added to the graduate from burettes in proportion such that the specimen is suspended in the solution. During the addition of the liquids the graduate is shaken to secure thorough mixing. When the mixture just suspends the specimen, a portion of the liquid is transferred to a small test tube and placed on the platform of a Westphal balance and the glass bob lowered therein. With the temperature shown by the thermometer in the bob in the range 73 to 78° F., the balance is adjusted until the pointer is at zero. The value shown on the scale is taken as the specific gravity.

(5) Determined by the method of ASTM D–790–49T.

While certain examples, structures, composition and process steps have been described for purposes of illustration, the invention is not limited to these. Variation and modification within the scope of the disclosure and the claims can readily be effected by those skilled in the art.

What I claim is:

1. A process for the polymerization of polymerizable 1-olefins containing a $CH_2=C=$ radical in the alkyl portion and having 2 to 8 carbon atoms, inclusive, comprising contacting said 1-olefin under polymerization conditions with a catalyst prepared by reacting (A) $TiX_y$ and (B) $M(BH_4)_z$ at a temperature in the range of 0 to 250° F., wherein X is a halide selected from the group consisting of chloride, bromide and iodide, M is at least one transition metal selected from the group consisting of zirconium and hafnium, y is an integer from 2 to 4, and z is an integer equivalent to the valence of M, wherein the molar ratio of (B) to (A) is in the range of 0.2 to 3.0.

2. The process of claim 1 wherein said admixing results in a solid reaction product which is separated and employed as the catalyst for the polymerization process.

3. The process of claim 2 wherein an aluminum halide selected from the group consisting of aluminum trichloride and aluminum trifluoride is also admixed with (A) and (B) in the preparation of the catalyst.

4. The process of claim 1 wherein said catalyst is impregnated on a porous support selected from the group consisting of natural clays and synthetic gels.

5. The process of claim 1 wherein said catalyst is preactivated by preheating at a temperature in the range of 150 to 300° F. for a period of 0.1 to 10 hours prior to contacting said olefin for polymerization.

6. The process for the polymerization of propylene comprising contacting said propylene with a catalyst in the presence of a liquid hydrocarbon diluent at a temperature in the range of 0 to 400° F. and a pressure sufficient to maintain liquid phase conditions in a polymerization zone and separating the resultant product, said catalyst being prepared by reacting zirconium tetraborohydride and titanium trichloride at a temperature in the range of 0 to 250° F. wherein the molar ratio of the zirconium tetraborohydride to titanium trichloride is in the range of 0.2 to 3.

7. The process for the polymerization of propylene comprising contacting said propylene with a catalyst in the presence of a liquid hydrocarbon diluent at a temperature in the range of 0 to 400° F. and a pressure sufficient to maintain liquid phase conditions in a polymerization zone and separating the resultant product, said catalyst being prepared by reacting hafnium tetraborohydride and titanium trichloride at a temperature in the range of 0 to 250° F. wherein the molar ratio of the hafnium tetraborohydride to titanium trichloride is in the range of 0.2 to 3.

8. The process for the polymerization of propylene comprising contacting said propylene with a catalyst in the presence of a liquid hydrocarbon diluent at a temperature in the range of 0 to 400° F. and a pressure sufficient to maintain liquid phase conditions in a polymerization zone and separating the resultant product, said catalyst being prepared by reacting zirconium tetraborohydride and titanium dichloride at a temperature in the range of 0 to 250° F. wherein the molar ratio of the zirconium tetraborohydride to titanium dichloride is in the range of 0.2 to 3.

9. The process for the polymerization of ethylene comprising contacting said ethylene wtih a catalyst in the presence of a liquid hydrocarbon diluent at a temperature in the range of 0 to 400° F. and a pressure sufficient to maintain liquid phase conditions in a polymerization zone and separating the resultant product, said catalyst being prepared by reacting zirconium tetraborohydride and titanium trichloride at a temperature in the range of 0 to 250° F. wherein the molar ratio of the zirconium tetraborohydride to titanium trichloride is in the range of 0.2 to 3.

10. The process for the polymerization of ethylene comprising contacting said ethylene with a catalyst in the presence of a liquid hydrocarbon diluent at a temperature in the range of 0 to 400° F. and a pressure sufficient to maintain liquid phase conditions in a polymerization zone and separating the resultant product, said catalyst being prepared by reacting zirconium tetraborohydride and titanium tetrachloride at a temperature in the range of 0 to 250° F. wherein the molar ratio of the zirconium tetraborohydride to titanium tetrachloride is in the range of 0.2 to 3.

11. A process for the polymerization of ethylene to a liquid polymer which comprises reacting titanium tetrachloride and zirconium tetraborohydride in the presence of a liquid hydrocarbon diluent at a temperature in the range of 0 to 250° F. wherein the molar ratio of zirconium tetraborohydride to titanium tetrachloride is in the range of 0.05 to 5.0 at a pressure sufficient to maintain the hydrocarbon diluent in a liquid phase for 0.1 to 100 hours, separating the resulting solid reaction product, contacting said ethylene in the presence of a hydrocarbon diluent and said reaction product in a polymerization zone at a temperature in the range of 0 to 400° F. and a pressure sufficient to maintain the diluent in the liquid phase to produce a liquid polymer and separating said liquid polymer product.

12. A process for the polymerization of propylene to a solid polymer which comprises contacting propylene in a polymerization zone in the presence of cyclohexane and a catalyst prepared by reacting titanium tetrachloride, zirconium tetraborohydride and aluminum trifluoride at a temperature in the range of 0 to 250° F. wherein the molar ratio of zirconium tetraborohydride to titanium tetrachloride is in the range of 0.2 to 3 and the molar ratio of aluminum trifluoride to the zirconium tetraborohydride and titanium tetrachloride is in the range of 0 to 1, maintaining said polymerization zone at a temperature in the range of 0 to 400° F. at a pressure sufficient to maintain a liquid phase in said zone and separating the resultant solid product.

13. A process for the polymerization of propylene to a liquid polymer which comprises reacting titanium tetrachloride and zirconium tetraborohydride in the presence of a liquid hydrocarbon diluent at a temperature in the range of 0 to 250° F., wherein the molar ratio of zirconium tetraborohydride to titanium tetrachloride is in the range of 0.05 to 5.0 at a pressure sufficient to maintain the hydrocarbon diluent in a liquid phase for 0.1 to 100 hours, separating the resulting solid reaction product, contacting said propylene in the presence of a hydrocarbon diluent and said reaction product in a polymerization zone at a temperature in the range of 0 to 400° F. and a pressure sufficient to maintain the diluent in the liquid phase to produce a liquid polymer and separating said liquid polymer product.

References Cited by the Examiner

UNITED STATES PATENTS 2,728,758   12/55   Field et al. _____ 260—94.9

(Other references on following page)

UNITED STATES PATENTS

| 2,840,551 | 6/58 | Field et al. | 260—93.7 |
| 2,914,515 | 11/59 | Stuart | 260—93.7 |

FOREIGN PATENTS

| 777,538 | 6/57 | Great Britain. |
| 801,401 | 9/58 | Great Britain. |
| 820,425 | 9/59 | Great Britain. |

OTHER REFERENCES

Linear and Stereoregular Addition Polymers, Interscience Publishers Inc., N.Y., June 11, 1959, pages 92 and 104.

JOSEPH L. SCHOFER, *Primary Examiner.*

M. LIEBMAN, *Examiner.*